United States Patent
Joyce et al.

(10) Patent No.: US 12,072,822 B2
(45) Date of Patent: Aug. 27, 2024

(54) PARALLEL GENERATOR SYSTEMS AND CONTROLLERS THEREFOR

(71) Applicant: Hamilton Sundstrand Corporation, Charlotte, NC (US)

(72) Inventors: Thomas P. Joyce, Rockford, IL (US); Michael C. Harke, DeForest, WI (US); William S. Heglund, Rockford, IL (US); Lon R. Hoegberg, Belvidere, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 414 days.

(21) Appl. No.: 17/458,037

(22) Filed: Aug. 26, 2021

(65) Prior Publication Data
US 2023/0065688 A1  Mar. 2, 2023

(51) Int. Cl.
*G06F 13/40* (2006.01)
*H02J 3/00* (2006.01)
*H02J 3/14* (2006.01)

(52) U.S. Cl.
CPC .............. *G06F 13/40* (2013.01); *H02J 3/007* (2020.01); *H02J 3/144* (2020.01)

(58) Field of Classification Search
CPC .. H02J 3/144; H02J 3/007; H02J 1/086; H02J 3/36; H02J 1/10; G06F 13/40
See application file for complete search history.

(56) References Cited

U.S. PATENT DOCUMENTS

| | | | |
|---|---|---|---|
| 3,753,078 A | 8/1973 | Hedel | |
| 6,356,471 B1* | 3/2002 | Fang | H02M 7/493 307/82 |
| 9,590,524 B1 | 3/2017 | Jacobson | |
| 2006/0056124 A1* | 3/2006 | Michalko | H02J 7/1438 361/62 |
| 2013/0285460 A1* | 10/2013 | DeHaven | H02M 3/285 307/82 |
| 2014/0285010 A1 | 9/2014 | Cameron | |
| 2017/0110880 A1 | 4/2017 | Chen et al. | |
| 2018/0159334 A1* | 6/2018 | Zhang | H02J 13/00006 |
| 2022/0368213 A1* | 11/2022 | Li | H02M 7/12 |

FOREIGN PATENT DOCUMENTS

| | | | | |
|---|---|---|---|---|
| CN | 108233513 A | * | 6/2018 | ............ H02H 7/268 |
| EP | 2077226 A2 | | 7/2009 | |

OTHER PUBLICATIONS

Extended European Search Report, of the European Patent Office, mailed on Jan. 27, 2023, in corresponding European Patent Application No. 22191531.7.

* cited by examiner

*Primary Examiner* — Santosh R Poudel

(57) ABSTRACT

A generator system can include a first generator, a first controller operatively connected to the first generator to control a first generator voltage output, a second generator, and a second controller operatively connected to the second generator to control a second generator voltage output. The first generator and the second generator can be configured in a parallel generator configuration to share load power. The first controller and the second controller can be configured to provide foldback control. The first controller and the second controller can be configured to calibrate foldback to correct for current sharing imbalance between the first generator and the second generator.

15 Claims, 4 Drawing Sheets

PARALLEL GENERATOR SYSTEMS AND CONTROLLERS THEREFOR

FIELD

This disclosure relates to parallel generator systems.

BACKGROUND

Some high-voltage direct-current (HVDC) electrical power generation systems (EPGSs) feature control algorithms to parallel generator sources to share load power. One method for load sharing is using a control algorithm that reduces output voltage based on load current, known as foldback control. This method requires that the slope of the voltage versus current curve is shallow such that a small change in output voltage causes a large change in source current. This has the undesired effect of causing a large difference in the current sharing between paralleled sources due to a small error in the controller's voltage sense measurement such that one source takes less current than it should and another takes more than it should.

Such conventional methods and systems have generally been considered satisfactory for their intended purpose. However, there is still a need in the art for improved parallel generator systems. The present disclosure provides a solution for this need.

SUMMARY

A generator system can include a first generator, a first controller operatively connected to the first generator to control a first generator voltage output, a second generator, and a second controller operatively connected to the second generator to control a second generator voltage output. The first generator and the second generator can be configured in a parallel generator configuration to share load power. The first controller and the second controller can be configured to provide foldback control. The first controller and the second controller can be configured to calibrate foldback to correct for current sharing imbalance between the first generator and the second generator.

In certain embodiments, the first controller and the second controller can be configured to control the voltage outputs of the respective first generator and second generator based on a current sensed downstream of each generator. The first generator can be in electrical communication with a first bus having a first line and a second line connected to a first load, and the second generator can be in electrical communication with a second bus having a third line and a fourth line connected to a second load.

The first generator can be connected to the first bus via a first rectifier and the second generator can be connected to the second bus via a second rectifier. Accordingly, the first bus and second bus can be DC buses.

The system can include a first tie bus connecting the first line of the first bus to the third line of the second bus, and a second tie bus connecting the second line of the first bus to the fourth line of the second bus. The first tie bus can include a first switch configured to selectively electrically communicate the first line and the third line, and the second tie bus can include a second switch configured to selectively electrically communicate the second line and the fourth line.

The generator system can include a first current sensor operatively connected to the first controller and disposed on the first line between the first rectifier and the first tie bus to sense a first generator source current, and a second current sensor operatively connected to the second controller and disposed on the third line between the second rectifier and the first tie bus to sense a second generator source current.

In certain embodiments, the generator system can include a third current sensor operatively connected to the first controller and disposed on the first line between the first tie bus and a load end of the first bus to sense a first load current. In certain embodiments, the generator system can include a fourth current sensor operatively connected to the second controller and disposed on the first line between the first tie bus and a load end of the first bus to sense the first load current.

In certain embodiments, the generator system can include a fifth current sensor operatively connected to the second controller and disposed on the third line between the first tie bus and a load end of the second bus to sense a second load current. In certain embodiments, the generator system can include a sixth current sensor operatively connected to the first controller and disposed on the third line between the first tie bus and a load end of the second bus to sense the second load current. The first controller and second controller can be configured to determine a total current by summing current readings from the third and sixth current sensors, and the fourth and fifth current sensors, respectively.

In certain embodiments, the generator system can include a third current sensor operatively connected to the second controller and disposed on the first line between the first tie bus and a rectifier end of the first bus to sense a first load current. In certain embodiments, the generator system can include a fourth current sensor operatively connected to the first controller and disposed on the second line between the second tie bus and a rectifier end of the first bus to sense the first load current. The first controller and second controller can be configured to determine a total current by summing current readings from the first and fourth current sensors, and the second and third current sensors, respectively.

Each controller can have a desired sharing percentage value. Each controller can be configured to determine a sharing error (e.g., as the difference of the desired sharing percentage value and the actual sharing percentage). For example, the sharing error (Sharing_error) can be determined by the following equation [1]:

$$\text{Sharing\_error}[\%] = (\text{Source\_current}[A]/\text{Total\_current}[A]) - \text{Desired\_sharing\_percentage}[\%].$$

Each controller can be configured to determine an offset voltage value (V_cal_offset) based on the sharing error (Sharing_error) and a constant voltage calibration offset maximum (V_cal_offset_max). For example, an offset voltage value (V_cal_offset) is determined by the following equation [2]:

$$V\_cal\_\text{offset}[V] = -\text{Sharing\_error}[\%] * V\_cal\_\text{offset\_max}[V].$$

Each controller can be configured to determine a regulation voltage (Regulation_voltage) based on a desired no-load regulation voltage (V_no_load), a respective source current (Source_current) of a respective generator, a foldback gain (foldback_gain), e.g., that is a slope of a foldback curve, and the calibration offset an offset voltage value (V_cal_offset) using the following equation [3]:

$$\text{Regulation\_voltage}[V] = V\_no\_\text{load}[V] - (\text{Source\_current}[A] * \text{foldback\_gain}[V/A]) + V\_cal\_\text{offset}[V].$$

In accordance with at least one aspect of this disclosure, a non-transitory computer readable medium, comprising computer executable instructions configured to cause a computer perform a method for controlling a parallel generator system. The method can include initializing a no-load regulation voltage variable (V_no_load) to a desired bus voltage, initializing a foldback gain variable (foldback_gain) based on a desired current sharing percentage that each of a plurality of generators sources to a total load (e.g., the foldback gain variable being a slope of a foldback curve), and initializing a calibration offset voltage variable (V_cal_offset) to zero. The method can include determining a respective generator's source current using current sensors in series with the respective generator's output and setting as variable (Source_current) and determining a desired voltage regulation point based on the desired no-load regulation voltage (V_no_load), the respective generator's source current measurement (Source_current), the foldback gain (foldback_gain), and the calibration offset variable (V_cal_offset) using equation [3] above. The method can also include determining a total current (Total_current) in the parallel generator system by summing current readings from current sensors in series with all loads and determining a load sharing error (Sharing_error) using the equation [1] above to compare sharing percentage to desired sharing percentage. The method can also include changing the calibration offset voltage variable (V_cal_offset) based on negative feedback of the sharing error (Sharing_error) and a constant (V_cal_offset_max) according to the equation [2] above.

In certain embodiments, a filtering (e.g., a rate of sampling) of the Source_current variable can be done slower than that of voltage regulation control such that a voltage regulation control loop is stable. Filtering (e.g., a rate of sampling) of the Sharing_error variable can be done slower than that of the Source_current and Total_current variables such that a regulation set point loop is stable. In certain embodiments, the constant V_cal_offset_max can be selected to limit the maximum calibration offset voltage based on acceptable voltage regulation limits.

In accordance with at least one aspect of this disclosure, a controller for a generator system can be configured to provide foldback control for load sharing by one or more parallel generators and calibrate foldback to correct for current sharing imbalance between the first generator and the second generator. In certain embodiments, calibrating foldback can include receiving current readings from at least two buses to determine a sharing error, and correcting a generator output voltage to reduce or eliminate the sharing error.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
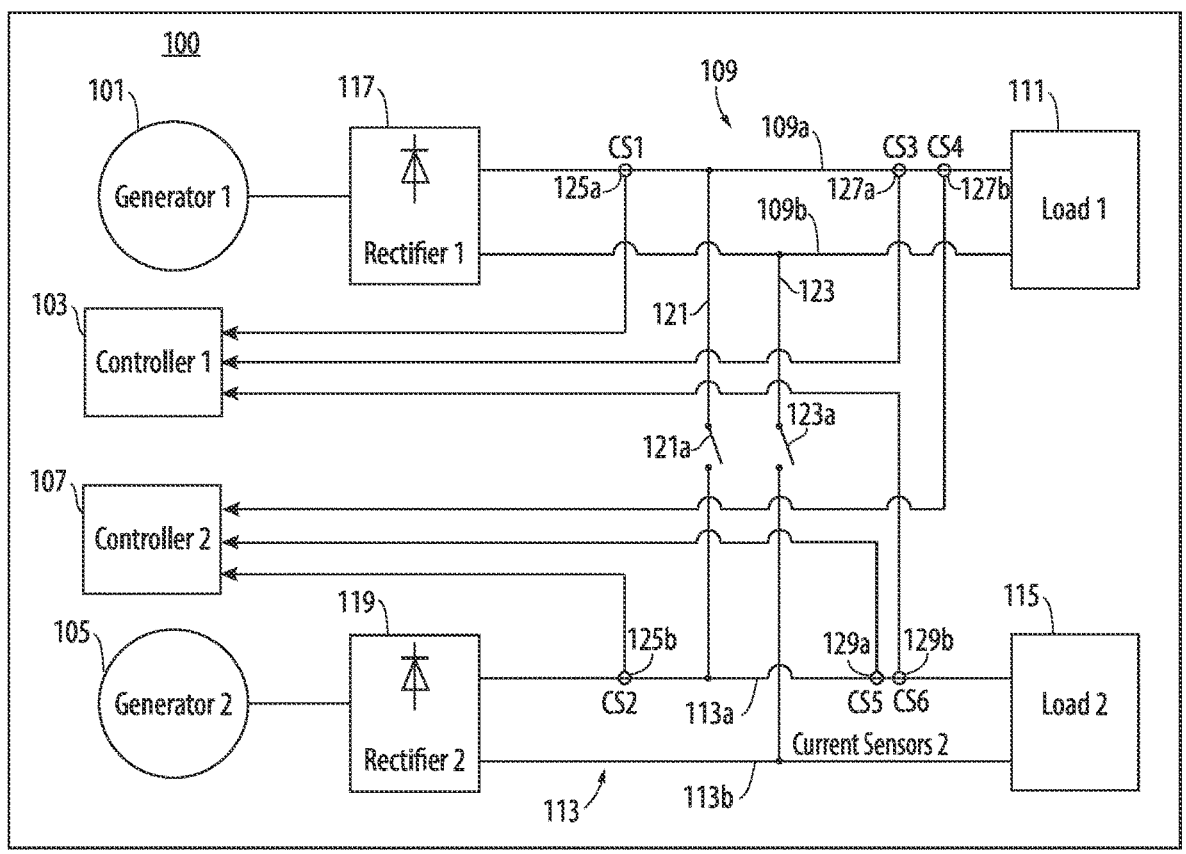
FIG. 1 is a schematic diagram of an embodiment of a system in accordance with this disclosure.
Figure 2:
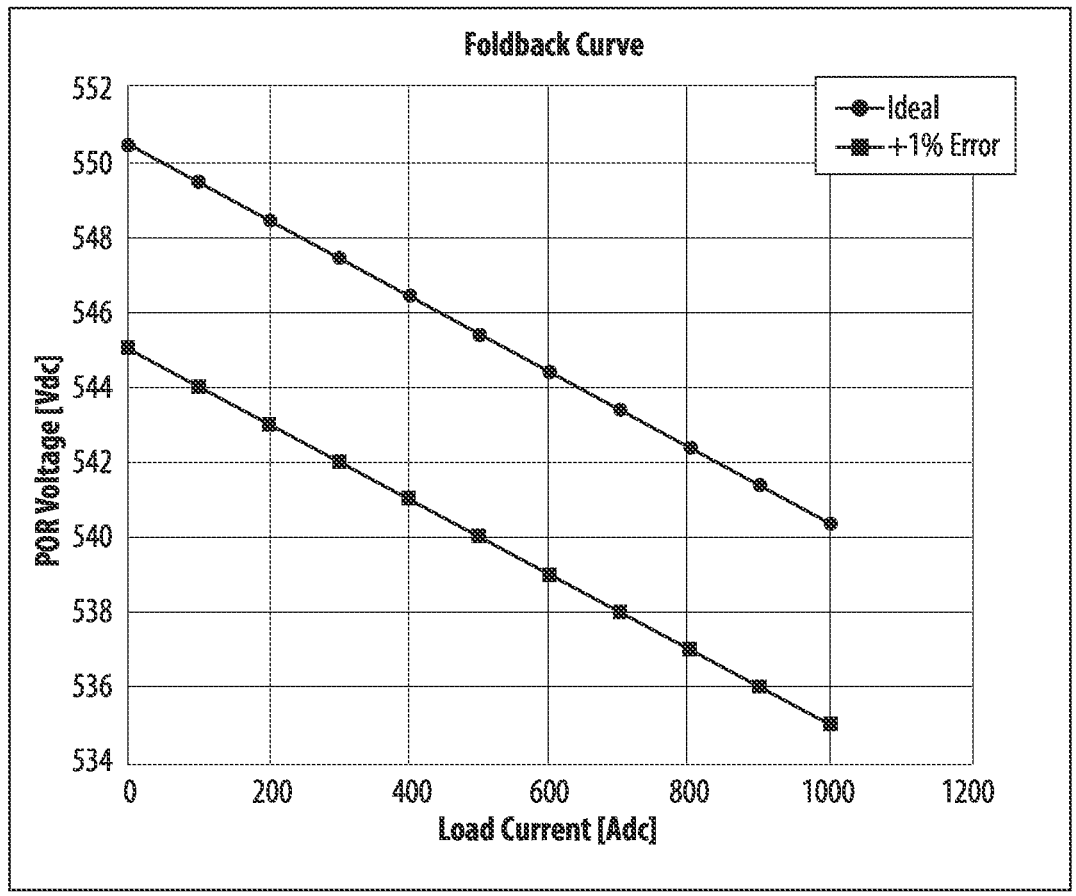
FIG. 2 is a chart showing an embodiment of an ideal foldback curve and a 1% error foldback curve.
Figure 3:
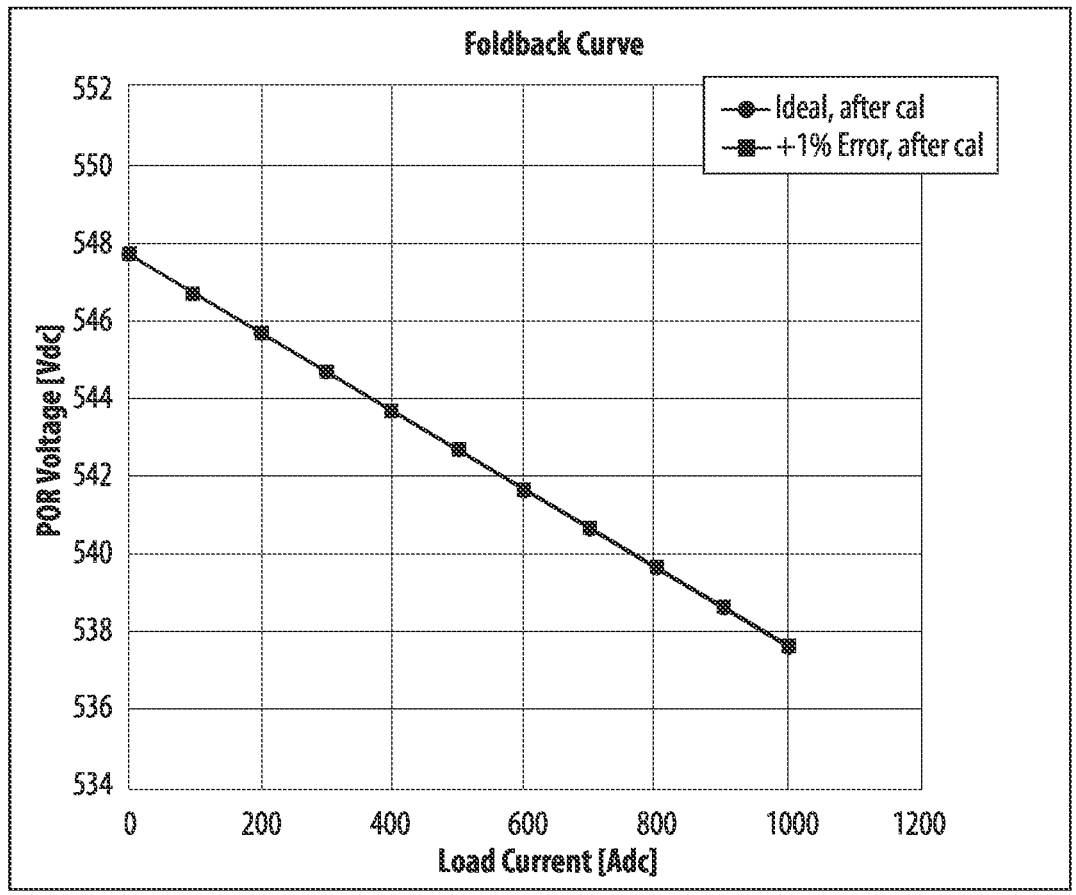
FIG. 3 is a chart showing an embodiment of an ideal foldback curve and a 1% error foldback curve after calibration (which are overlapped)

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3. Certain embodiments described herein can be used to ensure desired load sharing between two or more parallel generators.

Referring to FIG. 1, a generator system 100 can include a first generator 101 and a first controller 103 operatively connected to the first generator 101 to control a first generator voltage output. The system 100 can include a second generator 105 and a second controller 107 operatively connected to the second generator 105 to control a second generator voltage output. The first generator 101 and the second generator 105 can be configured in a parallel generator configuration to share load power, e.g., as shown in FIG. 1 where the rectified DC outputs of each of the first and second generators 101, 105 can be in parallel. Any suitable configuration to share load is contemplated herein.

Any suitable number of generators and/or controllers is contemplated herein. For example, more than two generators is contemplated herein. One or more controllers for any plurality of generators is contemplated herein. The controller(s) can include any suitable hardware and/or software module(s) configured to perform any suitable function, disclosed or otherwise. Any suitable number of controller(s) can be hosted on common hardware and/or software, and/or any suitable controller(s) or portion(s) thereof can be hosted on separate hardware and/or software. Any suitable disambiguation of controllers is contemplated herein, and is not limited to a single controller per generator.

The first controller 103 and the second controller 107 can be configured to provide foldback control (e.g., modifying voltage based on load current). In embodiments, the fold back control can include decreasing regulation voltage proportionally to load current, for example.

The first controller 103 and the second controller 107 can be configured to calibrate foldback to correct for current sharing imbalance between the first generator 101 and the second generator 105.

In certain embodiments, the first controller 103 and the second controller 107 can be configured to control the voltage outputs of the respective first generator 101 and second generator 105 based on a current sensed downstream of each generator 101, 105. In certain embodiments, the first generator 101 can be in electrical communication with a first bus 109 having a first line 109a (e.g., a positive rail) and a second line 109b (e.g., a negative rail) connected to a first load 111. The second generator 105 can be in electrical communication with a second bus 113 having a third line 113a (e.g., a positive rail) and a fourth line 113b (e.g., a negative rail) connected to a second load 115.

The first generator 101 can be connected to the first bus 109 via a first rectifier 117 and the second generator 105 can be connected to the second bus 113 via a second rectifier 119. Accordingly, the first bus 109 and second bus 113 can be DC buses.

The system 100 can include a first tie bus 121 connecting the first line 109a of the first bus 109 to the third line 113a of the second bus 113. The system can include a second tie bus 123 connecting the second line 109b of the first bus 109 to the fourth line 113b of the second bus 113. The first tie bus 121 can include a first switch 121a configured to selectively electrically communicate the first line 109a and the third line 113a. The second tie bus 123 can include a second switch 123a configured to selectively electrically communicate the second line 109b and the fourth line 113b.

The generator system 100 can include a first current sensor 125a operatively connected to the first controller 103 (e.g., to provide sensor signals to the controller) and disposed on the first line 109a between the first rectifier 117 and the first tie bus 121 (e.g., the point at which the tie bus connects to bus line) to sense a first generator source current (e.g., the current actually output by the first generator). The system 100 can include a second current sensor 125b operatively connected to the second controller 103 and disposed on the third line 113a between the second rectifier 119 and the first tie bus 121 to sense a second generator source current (e.g., the current actually output by the second generator).

In certain embodiments, the generator system 100 can include a third current sensor 127a operatively connected to the first controller 103 and disposed on the first line 109a between the first tie bus 121 and a load end (an end configured to be connected to a load) of the first bus 109 to sense a first load current (e.g., an actual current drawn by the first load). In certain embodiments, the generator system 100 can include a fourth current sensor 127b operatively connected to the second controller 107 and disposed on the first line 109a between the first tie bus 121 and a load end of the first bus 109 to sense the first load current.

In certain embodiments, the generator system 100 can include a fifth current sensor 129a operatively connected to the second controller 107 and disposed on the third line 113a between the first tie bus 121 and a load end of the second bus 113 to sense a second load current (e.g., an actual current drawn by the second load). In certain embodiments, the generator system 100 can include a sixth current sensor 129b operatively connected to the first controller 107 and disposed on the third line 113a between the first tie bus 121 and a load end of the second bus to sense the second load current. The first controller 103 and second controller 107 can be configured to determine a total current (e.g., drawn by a load) by summing current readings from the third and sixth current sensors 127a, 129b, and the fourth and fifth current sensors 127b, 129a, respectively.

One or more of the controllers 103, 107 (e.g., each) can have a desired sharing percentage value (e.g., predetermined and stored, or otherwise calculated or determined by the respective controller in any suitable manner). One or more of the controllers 103, 107 (e.g., each) can be configured to determine a sharing error (e.g., as the difference of the desired sharing percentage value and the actual sharing percentage). For example, the sharing error (Sharing_error) can be determined by the following equation [1]:

$$\text{Sharing\_error}[\%] = (\text{Source\_current}[A]/\text{Total\_current}[A]) - \text{Desired\_sharing\_percentage}[\%], \quad [1]$$

wherein Source_current is a respective source current as disclosed above, wherein Total_current is a respect total current on a bus line as disclosed above, and where Desired_sharing_percentage is a sharing percentage of a controller as disclosed above. One or more of the controllers 103, 107 (e.g., each) can be configured to determine an offset voltage value (V_cal_offset) based on the sharing error (Sharing_error) and a constant voltage calibration offset maximum (V_cal_offset_max). For example, an offset voltage value (V_cal_offset) is determined by the following equation [2]:

$$V\_cal\_\text{offset}[V] = -\text{Sharing\_error}[\%] * V\_cal\_\text{offset\_max}[V]. \quad [2]$$

One or more of the controllers 103, 107 (e.g., each) can be configured to determine a regulation voltage (Regulation_voltage) based on a desired no-load regulation voltage (V_no_load), a respective source current (Source_current) of a respective generator, a foldback gain (foldback_gain), e.g., that is a slope of a foldback curve, and the calibration offset an offset voltage value (V_cal_offset) using the following equation [3]:

$$\text{Regulation\_voltage}[V] = V\_no\_\text{load}[V] - (\text{Source\_current}[A] * \text{foldback\_gain}[V/A]) + V\_cal\_\text{offset}[V]. \quad [3]$$

Any suitable modifications to the above equations are contemplated herein. Any other suitable equations, relationships, and/or algorithms for compensating for calculating and compensating sharing error are contemplated herein.

In accordance with at least one aspect of this disclosure, a non-transitory computer readable medium, comprising computer executable instructions configured to cause a computer perform a method for controlling a parallel generator system (e.g., the system 100). The method can include initializing a no-load regulation voltage variable (V_no_load) to a desired bus voltage, initializing a foldback gain variable (foldback_gain) based on a desired current sharing percentage that each of a plurality of generators sources to a total load (e.g., the foldback gain variable being a slope of a foldback curve), and initializing a calibration offset voltage variable (V_cal_offset) to zero. The method can include determining a respective generator's source current using current sensors in series with the respective generator's output and setting as variable (Source_current) and determining a desired voltage regulation point based on the desired no-load regulation voltage (V_no_load), the respective generator's source current measurement (Source_current), the foldback gain (foldback_gain), and the calibration offset variable (V_cal_offset) using equation [3] above. The method can also include determining a total current (Total_current) in the parallel generator system by summing current readings from current sensors in series with all loads and determining a load sharing error (Sharing_error) using the equation [1] above to compare sharing percentage to desired sharing percentage. The method can also include changing the calibration offset voltage variable (V_cal_offset) based on negative feedback of the sharing error (Sharing_error) and a constant (V_cal_offset_max) according to the equation [2] above.

In certain embodiments, a filtering (e.g., a rate of sampling) of the Source_current variable can be done slower than that of voltage regulation control such that a voltage regulation control loop is stable. Filtering (e.g., a rate of sampling) of the Sharing_error variable can be done slower than that of the Source_current and Total_current variables such that a regulation set point loop is stable. In certain embodiments, the constant V_cal_offset_max can be selected to limit the maximum calibration offset voltage based on acceptable voltage regulation limits.

In accordance with at least one aspect of this disclosure, a controller (e.g., controller 103 and/or controller 107) for a generator system (e.g., system 100) can be configured to provide foldback control for load sharing by one or more parallel generators and calibrate foldback to correct for current sharing imbalance between the first generator and the second generator. In certain embodiments, calibrating foldback can include receiving current readings from at least two buses (e.g., connected to different generators) to determine a sharing error, and correcting a generator output voltage to reduce or eliminate the sharing error.

Embodiments can include a method for calibrating current sharing in paralleled DC sources (e.g., an AC generator and DC rectifier combination) using foldback control. In embodiments, the generator controllers can implement a method for calibrating foldback control curves based on real-time current sensor data to correct for current sharing imbalance. Embodiments allow for paralleled sources to share load power accurately despite an extremely high system sensitivity to error in the voltage sense circuitry, where they would otherwise be unable to share current reliably.

In a practical example, a sharing imbalance can cause an about 50% current sharing error due to an about 1% voltage sensing error without correction. For example, an example non-calibrated foldback curve is shown in FIG. 2. In this example, one channel has an ideal curve (no-load at 545 V, 1000 A load at 535 V) and the other has +1% voltage error. Observing these curves, the +1% curve will source just above 1000 A at 540 V while the ideal curve sources 500 A, which is greater than 50% current error due to the 1% voltage error.

Referring to FIG. 3, calibrated foldback curves are shown in accordance with embodiments of this disclosure. When a calibration technique, e.g., as described above, is applied to each channel, the foldback curves shift up and down to match one another and eliminate current sharing error due to voltage sensing error.

Using current sensors for controller feedback, e.g., as shown in FIG. 1, the calibration method can be implemented as follows. The controllers can initialize a no-load regulation voltage variable V_no_load to the desired bus voltage. The controllers can initialize a foldback gain variable foldback_gain based on the desired current sharing percentage that each generator sources to the total load. This can be the slope of the foldback curve. The controllers initialize a calibration offset voltage variable V_cal_offset to zero. The controllers can determine their respective generator's source current using current sensors (e.g., sensors 125a, 125b) in series with their generator's output and set this as a variable Source_current. The filtering of the Source_current variable can be significantly slower than that of the voltage regulation loop such that the voltage regulation control loop is stable. The controllers can determine the desired voltage regulation point based on the desired no-load regulation voltage V_no_load, the generator's source current measurement Source_current, the foldback gain foldback_gain, and the calibration offset variable V_cal_offset using equation [3] above. The controllers can determine the total current in the system by summing the current readings from the sensors in series with both channels' loads (e.g., sensors 127a, 129b for the first controller 103, and sensors 127b, 129a for the second controller 107).

The controllers can determine a load sharing error signal Sharing_error using equation [1] above to compare sharing percentage to desired sharing percentage. The filtering of the Sharing_error variable can be significantly slower than that of the Source_current and Total_current variables such that the regulation set point loop is stable. The controllers can change the calibration offset voltage variable V_cal_offset based on negative feedback of the sharing error signal Sharing_error and a constant V_cal_offset_max (which can limit the maximum calibration offset voltage based on acceptable voltage regulation limits), using equation [2] above. V_cal_offset from equation [2] can feed into equation [3].

Figure 4:
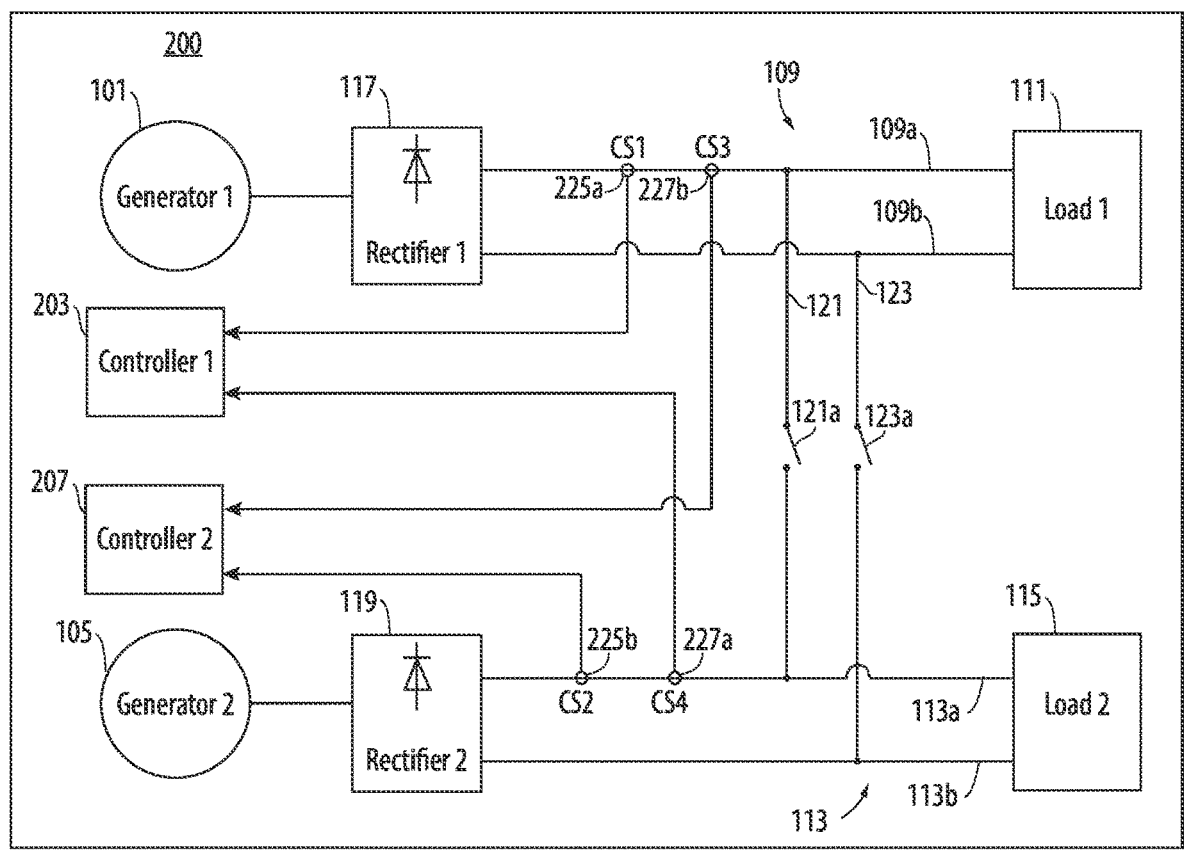
FIG. 4 is a schematic diagram of another embodiment of a system in accordance with this disclosure.

In certain embodiments, such as shown in FIG. 4, a generator system 200 can have similar components as shown and described with respect to generator system 100. For brevity, the description of common elements that have been described above are not repeated. The generator system 200 can include only four current sensors, rather than the six provided in the embodiment of a system 100 shown in FIG. 1. In this case, the controllers 203, 207 can determine the total current in the system 200 by summing the current sensor readings at the output of the rectifiers 217, 219, instead of the loads 111, 115. More particularly, controller 203 can read the first and fourth current sensors 225a, 227b, and controller 207 can read the second and third current sensors 225b, 227a to determine total current of the system 200. Because the first current sensor 225a and the second current sensor 225b can already implement the foldback control scheme without calibration, in system 200, it is possible to implement the calibration routine (e.g. as described above with respect to equations [1], [2], and [3]) by additionally including the third current sensor 227a and the fourth current sensor 227b. In certain instances, system 200 may have improved efficiency over certain generator systems with respect to hardware needed to implement the calibration scheme.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A generator system, comprising:
a first generator;
a first controller operatively connected to the first generator to control a first generator voltage output;
a second generator;
a second controller operatively connected to the second generator to control a second generator voltage output, wherein the first generator and the second generator are configured in a parallel generator configuration to share load power, wherein the first controller and the second controller are configured to provide foldback control, wherein the first controller and the second controller are configured to calibrate foldback to correct for current sharing imbalance between the first generator and the second generator, and wherein the first generator is connected to a first bus via a first rectifier and the second generator is connected to a second bus via a second rectifier such that the first bus and second bus are DC buses;

a first tie bus connecting a first line of the first bus to a third line of the second bus, wherein the first tie bus includes a first switch configured to selectively electrically couple the first line and the third line;

a second tie bus connecting a second line of the first bus to a fourth line of the second bus, wherein the second tie bus includes a second switch configured to selectively electrically couple the second line and the fourth line;

a first current sensor operatively connected to the first controller and disposed on the first line between the first rectifier and the first tie bus to sense a first generator source current;

a second current sensor operatively connected to the second controller and disposed on the third line between the second rectifier and the first tie bus to sense a second generator source current;

a third current sensor operatively connected to the first controller and disposed on the first line between the first tie bus and a load end of the first bus to sense a first load current;

a fourth current sensor operatively connected to the second controller and disposed on the first line between the first tie bus and the load end of the first bus to sense the first load current;

a fifth current sensor operatively connected to the second controller and disposed on the third line between the first tie bus and a load end of the second bus to sense a second load current; and a sixth current sensor operatively connected to the first controller and disposed on the third line between the first tie bus and the load end of the second bus to sense the second load current, wherein the first controller and second controller are configured to determine a total current by summing current readings from the third and sixth current sensors, and the fourth and fifth current sensors, respectively.

2. The generator system of claim 1, wherein the first controller and the second controller are configured to control the first generator voltage output of the first generator and the second generator voltage output of the second generator based on a current sensed downstream of each generator.

3. The generator system of claim 2, wherein the first generator is in electrical communication with the first bus having the first line and the second line connected to a first load, and the second generator is in electrical communication with the second bus having the third line and the fourth line connected to a second load.

4. The generator system of claim 1, further comprising:
a seventh current sensor operatively connected to the second controller and disposed on the first line between the first tie bus and a rectifier end of the first bus to sense the first load current; and
an eighth current sensor operatively connected to the first controller and disposed on the second line between the second tie bus and the rectifier end of the first bus to sense the first load current;

wherein the first controller and the second controller are further configured to determine the total current by summing current readings from the first and eighth current sensors, and the second and seventh current sensors, respectively.

5. The generator system of claim 4, wherein each controller has a desired sharing percentage value, wherein each controller is configured to determine a sharing error.

6. The generator system of claim 5, wherein the sharing error (Sharing_error) is determined by the following equation:

$$\text{Sharing\_error}[\%] = (\text{Source\_current}[A]/\text{Total\_current}[A]) - \text{Desired\_sharing\_percentage}[\%].$$

7. The generator system of claim 6, wherein each controller is configured to determine an offset voltage value (V_cal_offset) based on the sharing error and a voltage calibration offset maximum (V_cal_offset_max) constant.

8. The generator system of claim 7, wherein the V_cal_offset variable is determined by the following equation:

$$V\_cal\_offset[V] = -\text{Sharing\_error}[\%] * V\_cal\_offset\_max[V].$$

9. The generator system of claim 8, wherein each controller is configured to determine a regulation voltage (Regulation_voltage) based on a desired no-load regulation voltage (V_no_load), a respective source current (Source_current) variable of a respective generator, a foldback gain (foldback_gain) that is a slope of a foldback curve, and the V_cal_offset variable using the following equation:

$$\text{Regulation\_voltage}[V] = V\_no\_load[V] - (\text{Source\_current}[A] * \text{foldback\_gain}[V/A]) + V\_cal\_offset[V].$$

10. A non-transitory computer readable medium comprising computer executable instructions configured to cause a computer to perform a method for controlling a parallel generator system, the method comprising:
initializing a no-load regulation voltage (V_no_load) variable to a desired bus voltage;
initializing a foldback gain (foldback_gain) variable based on a desired current sharing percentage that each of a plurality of generators sources to a total load, wherein the foldback_gain variable is a slope of a foldback curve;
initializing a calibration offset voltage (V_cal_offset) variable to zero;
determining a source current (Source_current) variable of a respective generator using current sensors in series with an output of the respective generator;
determining a desired voltage regulation point based on the V_no_load variable, the Source_current variable of the respective generator, the foldback_gain variable, and the V_cal_offset variable using the following equation:

$$\text{Regulation\_voltage}[V] = V\_no\_load[V] - (\text{Source\_current}[A] * \text{foldback\_gain}[V/A]) + V\_cal\_offset[V];$$

determining a total current (Total_current) variable in the parallel generator system by summing current readings from the current sensors in series with all loads;
determining a load sharing error (Sharing_error) variable using the following equation to compare a sharing percentage to a desired sharing percentage:

$$\text{Sharing\_error}[\%] = (\text{Source\_current}[A]/\text{Total\_current}[A]) - \text{Desired\_sharing\_percentage}[\%];$$

changing the V_cal_offset variable based on negative feedback of the Sharing_error variable and a voltage calibration offset maximum (V_cal_offset_max) constant according to the following equation:

$$V\_cal\_\text{offset}[V] = -\text{Sharing\_error}[\%] * V\_cal\_\text{offset\_max}[V]; \text{ and}$$

operating the plurality of generators to correct output voltage to reduce or eliminate the determined load sharing error.

11. The non-transitory computer readable medium of claim 10, wherein filtering of the Source_current variable is done slower than that of voltage regulation control such that a voltage regulation control loop is stable.

12. The non-transitory computer readable medium of claim 11, wherein filtering of the Sharing_error variable is done slower than that of the Source_current variable and the Total_current variable such that a regulation set point loop is stable.

13. The non-transitory computer readable medium of claim 12, wherein the V_cal_offset_max constant is selected to limit a maximum calibration offset voltage based on acceptable voltage regulation limits.

14. A generator system, comprising:
a first generator connected to a first bus via a first rectifier such that the first bus is a DC bus;
a first controller operatively connected to the first generator to control a first generator voltage output;
a second generator connected to a second bus via a second rectifier such that the second bus is a DC bus, wherein the first generator and the second generator are configured in a parallel generator configuration to share load power;
a second controller operatively connected to the second generator to control a second generator voltage output, wherein the first controller and the second controller are configured to:
modify regulation voltage based on load current to provide foldback control of load sharing by the first and second generators; and
calibrate the foldback control to correct for current sharing imbalance between the first generator and the second generator, determined by at least one sensor in the generator system,
a first tie bus connecting a first line of the first bus to a third line of the second bus, wherein the first tie bus includes a first switch configured to selectively electrically couple the first line and the third line;
a second tie bus connecting a second line of the first bus to a fourth line of the second bus, wherein the second tie bus includes a second switch configured to selectively electrically couple the second line and the fourth line;
a first current sensor operatively connected to the first controller and disposed on the first line between the first rectifier and the first tie bus to sense a first generator source current;
a second current sensor operatively connected to the second controller and disposed on the third line between the second rectifier and the first tie bus to sense a second generator source current;
a third current sensor operatively connected to the first controller and disposed on the first line between the first tie bus and a load end of the first bus to sense a first load current;
a fourth current sensor operatively connected to the second controller and disposed on the first line between the first tie bus and the load end of the first bus to sense the first load current;
a fifth current sensor operatively connected to the second controller and disposed on the third line between the first tie bus and a load end of the second bus to sense a second load current; and
a sixth current sensor operatively connected to the first controller and disposed on the third line between the first tie bus and the load end of the second bus to sense the second load current,
wherein the first controller and second controller are configured to determine a total current by summing current readings from the third and sixth current sensors, and the fourth and fifth current sensors, respectively.

15. The generator system of claim 14, wherein to calibrate the foldback control the first and second controllers are configured to:
receive current readings from the first and second tie buses to determine a sharing error; and
correct at least one of the first and second generator voltage outputs to reduce or eliminate the sharing error.

* * * * *